E. C. BALDON.
REAR SPRING CYCLE FORK.
APPLICATION FILED MAY 22, 1912.
1,058,839.
Patented Apr. 15, 1913.
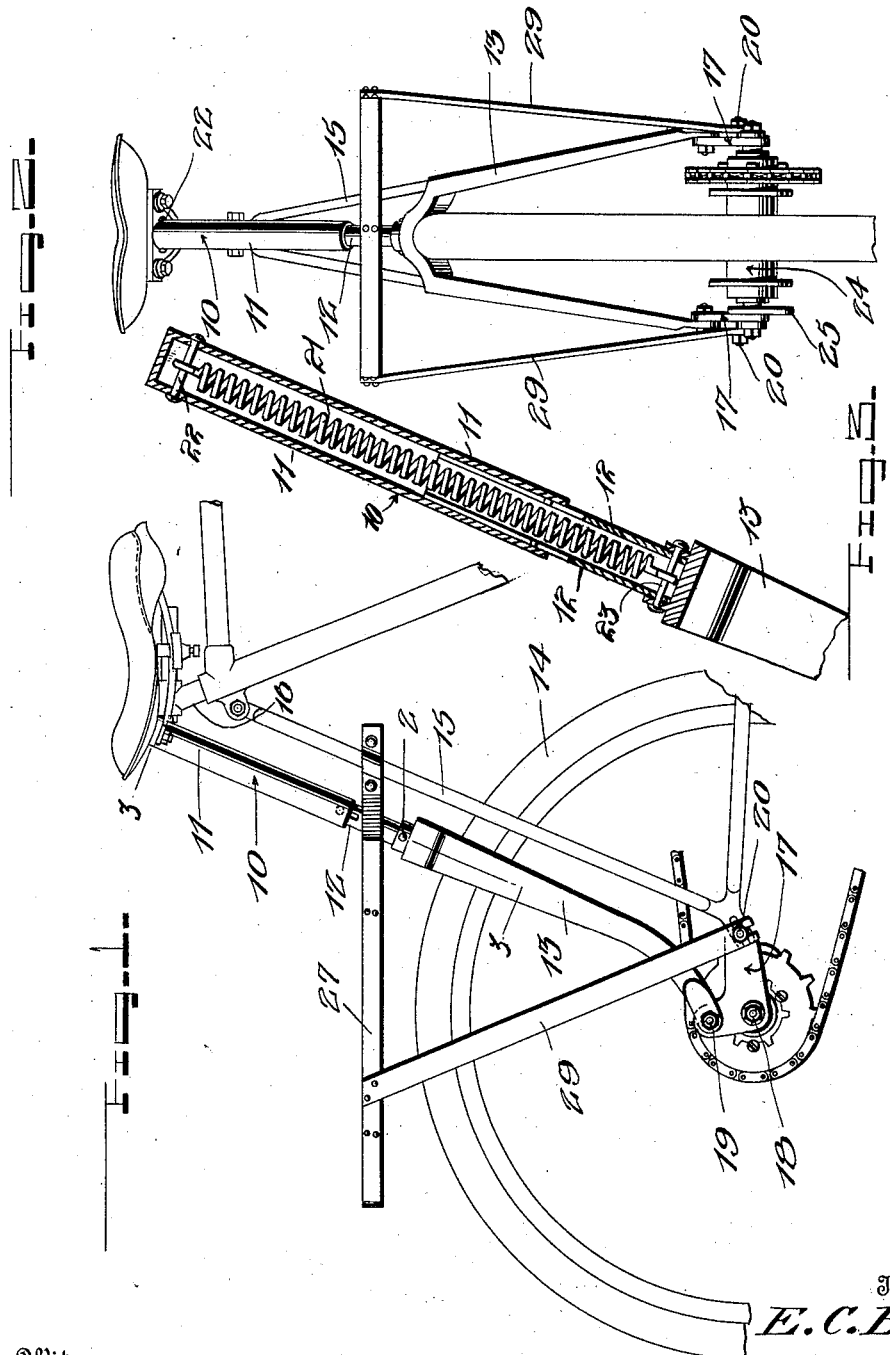
Witnesses
W. H. Rodwell
Francis Boyle
Inventor
E. C. Baldon
By Chandler & Chandler
Attorney

UNITED STATES PATENT OFFICE.

EARLE C. BALDON, OF RICHMOND, VIRGINIA.

REAR SPRING CYCLE-FORK.

1,058,839.  Specification of Letters Patent.  Patented Apr. 15, 1913.

Application filed May 22, 1912. Serial No. 699,014.

*To all whom it may concern:*

Be it known that I, EARLE C. BALDON, a citizen of the United States, residing at Richmond, in the county of Henrico, State of Virginia, have invented certain new and useful Improvements in Rear Spring Cycle-Forks; and I do hereby declare the following to be a full, clear, and exact description of the invention, such as will enable others skilled in the art to which it appertains to make and use the same.

This invention relates to bicycles, motor-cycles and the like, and has for the principal object to provide a novel spring fork for supporting the seat, this fork serving as a cushion to minimize vibration and promote the ease and comfort of the rider under all conditions of service.

A further object of the invention is to provide novel link connections for pivotally connecting the terminals of the spring fork to the frame.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of a part of a bicycle equipped with my improvement. Fig. 2 is a rear elevation of the parts shown in Fig. 1. Fig. 3 is a sectional view taken on the line 3—3 Fig. 1.

Referring now to the drawings in which like characters of reference designate similar parts, 10 designates in general the spring fork comprising the subject-matter of this invention, the fork comprising a shank consisting of telescoping tubes 11 and 12, the lower tube 12 being equipped with fork arms 13 which are adapted to straddle the rear wheel 14 in rear of the rear fork 15 of the frame, and the upper tube being secured to the seat post 16 by hinging, pivoting, or otherwise.

For pivotally connecting the fork arms to the frame I provide a pair of substantially rightangular links 17, both links being provided in their elbows with slotted or forked openings to receive the rear wheel axle 18. The terminals of the arms are pivotally connected to the upstanding legs of the links by pivot pins 19, while the horizontal legs of the links are pivotally connected to the frame through the instrumentality of pivot pins 20.

A helical spring 21 is fixed at the upper end to the upper tube of the fork shank through the instrumentality of a bolt 22, and the lower end of the spring is fixed to the lower tube through the instrumentality of a bolt 23, this spring extending through the bores of both tubes and forming a cushion which takes up the telescoping movement of the lower tube within the upper tube to a certain extent and thus reduces to a minimum reciprocating movement of the upper tube and seat during passage of the bicycle over rough road beds. Both of the links 17 rock simultaneously in an arc on the pivot pins 20 and thus obviate the shock and jar which would otherwise occur and be transmitted to the seat were the links rigidly secured to the frame.

In the present instance a coaster brake 24 is shown assembled with the rear wheel hub, the attaching arm 25 of the coaster brake being secured to one of the links 17 through the instrumentality of a bolt 26. Furthermore, the frame is also shown equipped with a package support comprising a platform formed of spaced horizontally disposed rods 27 which are secured at the forward ends to the arms of the frame rear fork and are connected at intervals by cross braces 28. Inclined props 29 are fixed at the upper ends to the rods 27 and are provided at the lower ends with openings which receive the pivot bolts 20 above described.

What is claimed, is:—

An attachment for bicycles comprising a fork having a shank formed of telescoping spring controlled members one of which is adapted to be attached to a bicycle seat post, and the other of which is equipped with arms adapted to straddle the rear wheel in rear of the rear fork of a bicycle frame, a pair of substantially right-angular links having their upstanding legs pivotally connected to the terminals of said arms, and having openings in their elbows to receive the axle of the rear wheel of a bicycle, and pivot pins carried by the horizontal legs of said right-angular links for pivotally attaching said links to the bicycle frame.

In testimony whereof, I affix my signature, in presence of two witnesses.

EARLE C. BALDON.

Witnesses:
J. KENT RAWLEY,
JOHN A. LUNDIN.

Copies of this patent may be obtained for five cents each, by addressing the "Commissioner of Patents. Washington, D. C."